United States Patent Office 3,090,794
Patented May 21, 1963

3,090,794
PREPARATION OF DIALKYL ESTERS OF ALPHA-SULFO FATTY ACIDS
Joseph J. McBride, Jr., Panama City, Fla., and Eugene J. Miller, Jr., Wheaton, Ill., assignors to Armour and Company, Chicago, Ill., a corporation of Delaware
No Drawing. Filed Aug. 23, 1962, Ser. No. 218,845
6 Claims. (Cl. 260—400)

This invention relates to the preparation of dialkyl esters of alpha-sulfo fatty acids, and more particularly to a process in which the alpha-sulfo fatty acid is reacted with an olefin in the presence of iron pentacarbonyl as the catalyst.

An object of the invention is to provide a new process for the preparation of dialkyl esters of alpha-sulfo fatty acids. A further object is to provide for the preparation of dialkyl esters of alpha-sulfo fatty acids with effective resultant yields and a saving in preparation costs. Yet another object is to provide a process for manufacturing dialkyl esters of alpha-sulfo fatty acids while employing a catalyst which gives effective yields while eliminating the need of solvents during the reaction step, etc. A still further object is to provide for the preparation of dialkyl esters of alpha-sulfo fatty acids useful as plasticizers, flotation and flocculation agents for minerals, and for other purposes. Other specific objects and advantages will appear as the specification proceeds.

In one embodiment of the invention, we react an alpha-sulfo fatty acid with an olefin in the presence of iron pentacarbonyl as the catalyst.

Included within the meaning of the alpha-sulfo fatty acids used in the process is a compound having the general formula:

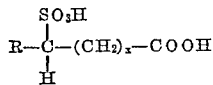

in which R is a radical selected from the group consisting of a hydrogen atom and an aliphatic hydrocarbon radical having from about 8 to 22 carbon atoms, and $x$ is an integer ranging from 0 to about 22, provided that the total of the integer represented by the letter $x$ and the number of carbon atoms in the radical R does not exceed about 22.

Examples of olefins which may be used in the process are ethylene, propylene, butylene, etc. We prefer to use olefins in which the number of carbon atoms ranges from about 2 to 8, and to employ an excess of olefin. A slight theoretical excess of olefin may be used to give satisfactory results, but we prefer to use 2 moles or more of olefin per mole of alpha-sulfo fatty acid.

The iron pentacarbonyl has been found to be an excellent catalyst giving satisfactory yields while at the same time reducing the cost of preparation. The preparations may be varied substantially. Good results have been obtained with about 0.01 to 0.1 mole of catalyst per mole of alpha-sulfo fatty acid. By the use of iron pentacarbonyl as the catalyst, we find that a solvent need not be present during the process.

Pressures under which the process will function range from about 1 to 80 atmospheres. When higher olefins are used, the process takes place at atmospheric pressure. When lower olefins are utilized, better results are obtained at higher pressures. For example, excellent results have been obtained when using ethylene in the 500 to 600 p.s.i. range, while a lower pressure range (15 to 25 p.s.i.) is preferred for propylene.

The temperatures may vary widely. With lower olefins, such as ethylene and propylene, it is preferred that the temperature be from about 120° C. to about 150° C. For example, when ethylene is used, the temperature preferably is from 125–140° C., and the time of reaction is from about 3 to 6 hours. When higher olefins are used, higher temperatures are preferred. Also, longer periods are preferred when using higher olefins.

The recovery of the esters from the unreacted acid may be carried out in any suitable manner. We prefer to dissolve the esters in solution with Skellysolve F, removing the unreacted acid by filtration, washing with 50% aqueous methanol, and finally drying over sodium sulfate.

The following specific examples may be set out as illustrative of the process:

Example I

To a 300 cc. stainless steel stirred autoclave was added 33.65 g. (0.1 mole) of alpha-sulfo palmitic acid and 0.5 ml. of iron pentacarbonyl. The bomb was sealed and ethylene charged to a pressure of 600–700 p.s.i.g. Temperature was raised to 125–135° C. for about 5 hours. The product was removed from the bomb with Skellysolve F, washed with 50% aqueous methanol, dried over sodium sulfate, and stripped to yield 11.7 g. (29.8% crude) of light amber product.

Example II

The process was carried out as described in Example I, the ethylene being charged to a pressure of 600 p.s.i.g. The temperature was raised to 130° C. for about 6 hours. The contents were then removed with Skellysolve F, washed with 50% aqueous methanol, and dried over sodium sulfate, the results being comparable to those described in Example I.

While in the foregoing specification we have set out ingredients and procedures in considerable detail for the purpose of illustrating embodiments of the invention, it will be understood that such details may be varied widely by those skilled in the art without departing from the spirit of our invention.

We claim:
1. A method for preparing dialkyl esters of alpha-sulfo fatty acids, comprising reacting an alpha-sulfo fatty acid with a slight theoretical excess of an olefin having from about 2 to 8 carbon atoms in the presence of at least 0.01 mole of iron pentacarbonyl per mole of alpha-sulfo fatty acid, and recovering the ester.

2. A method for preparing dialkyl esters of alpha-sulfo fatty acids, comprising reacting an alpha-sulfo fatty acid with ethylene in the presence of at least 0.01 mole of iron pentacarbonyl per mole of alpha-sulfo fatty acid under pressures of from about 500 to 700 pounds, at temperatures of from about 125–140° C., for about 3 to 6 hours, and recovering the ester.

3. A method for preparing dialkyl esters of alpha-sulfo fatty acids, comprising reacting an alpha-sulfo fatty acid with at least two moles of an olefin having about 2 to 3 carbon atoms per mole of alpha-sulfo fatty acid and in the presence of at least 0.01 mole of iron pentacarbonyl per mole of alpha-sulfo fatty acid at temperatures of from 120–150° C. for from about 4 to 8 hours, and recovering the ester.

4. The process of claim 3 in which the olefin is ethylene.

5. A method for preparing dialkyl esters of alpha-sulfo fatty acids, comprising reacting an alpha-sulfo fatty acid with at least two moles of ethylene in the presence of about 0.01 to 0.1 mole of iron pentacarbonyl per mole of alpha-sulfo fatty acid at a pressure of about 500 to 700 pounds per square inch and at a temperature of about 125–130° C. for about 5 hours.

6. The process of claim 5 in which the acid is alpha-sulfo palmitic acid.

No references cited.